United States Patent [19]

Georget

[11] Patent Number: 4,822,324

[45] Date of Patent: Apr. 18, 1989

[54] ENDLESS POWER TRANSMISSION BELT

[75] Inventor: Pierre Georget, Chambray Les Tours, France

[73] Assignee: Hutchinson, Paris, France

[21] Appl. No.: 146,480

[22] Filed: Jan. 21, 1988

[30] Foreign Application Priority Data

Jan. 28, 1987 [FR] France ................. 87 00982

[51] Int. Cl.$^4$ ............................................. F16G 1/10
[52] U.S. Cl. ................................. 474/268; 474/249
[58] Field of Search .............. 474/268, 249, 265, 252, 474/270, 271, 148, 237

[56] References Cited

U.S. PATENT DOCUMENTS

| 2,471,969 | 5/1949 | Meyer | 474/148 |
| 3,404,577 | 10/1968 | Zahn | 474/148 |
| 4,330,287 | 5/1982 | Fischer | 474/268 X |
| 4,464,148 | 8/1984 | Tanaka | 474/268 X |
| 4,678,455 | 7/1987 | Hollaway, Jr. | 474/268 X |

FOREIGN PATENT DOCUMENTS 2129386 10/1972 France .

Primary Examiner—Thuy M. Bui
Attorney, Agent, or Firm—Oblon, Fisher, Spivak, McClelland & Maier

[57] ABSTRACT

In an endless power transmission belt including a matrix made from an elastomer material, advantageously of the rubber type, and a longitudinal reinforcement of twisted cords, the reinforcement is chosen, with respect to its physical tension characteristics and its positioning in the matrix, so that the belt has an overall extension modulus sufficiently low so that it makes it possible to fit the belt, by exerting a tractive force, on the pulleys with which it cooperates and yet keeps a minimum appropriate tension after positioning so as to ensure satisfactory operation of the transmission which it equips.

18 Claims, 1 Drawing Sheet

ENDLESS POWER TRANSMISSION BELT

BACKGROUND OF THE INVENTION

1. Field of the Invention

The invention relates to an endless power transmission belt.

2. Description of the Prior Art

In multiple constructions endless power transmission belts are known having a cabled reinforcement embedded in a rubbery material matrix which are adapted for cooperating with the pulleys of a driven shaft, and of a drive shaft respectively. Thus there exist, besides V belts, with or without teeth, ribbed belts—that is to say, belts whose section through a diametrical plane, is a profile with an internal face formed with adjacent teeth, having a triangular or trapezoidal cross section. Such a belt is provided for cooperating with pulleys whose rim has a mating profile—that is to say, has adjacent grooves with triangular or trapezoidal cross section. Such belts, which find application in very numerous fields, are designated in schedules by the letters H, J, A, L or M, which define the pitch and/or the shape of the teeth as well as the radial thickness of the belts. Those of type H or J, with tooth pitches of 1.6 and 2.34 mm and thickness of about 3 mm and 4 mm, respectively, are used in the electric household appliance field, particularly for driving clothes washing or clothes drying machine drums from the electric motors of these machines. In such applications, the rotational speeds are of the order of 400 to 1200 rpm. Tensioning of the belt, after it has been fitted over the pulley of the drive shaft and over the pulley of the driven shaft, is generally carried out by moving the motor mounted on a pivoting shoe and locking it in position when the required tension is reached or by means of a spring tensioner when the powers to be transmitted are lower than in the preceding case.

Whatever the operating mode used, the tension must be adjusted accurately so that the rotational speed of the driven member is very close to the desired theoretical value, relatively small variations with respect to this theoretical value causing unsatisfactory operation for washing and drying clothes, for example. The result is that to the cost of the pivoting means for adjusting the between axis distance of the driven and drive shafts is added that of the adjustment of the tension after fitting the belt on the pulleys with which it cooperates. Furthermore, neither the mounting of the motor (whose position must be adjusted) nor that of the belt can be carried out automatically.

To overcome these difficulties, attempts were then made to provide endless power transmission belts that were sufficiently extendable so that they could be mounted on the pulleys with which they cooperate without modifying the distance therebetween, on the one hand, and, on the other, that were sufficiently resilient so that, after mounting, they themselves provided the required tension for good power transmission. Such belts, manufactured by extruding or molding a thermoplastic or thermosetting material, particularly with a polyester type resing basis, have, however, proved unsatisfactory, mainly because of the low adhesion between them and the members with which they cooperate.

OBJECT OF THE INVENTION

Thus the problem arises of providing an endless power transmission belt which, while making possible automatic fitting on the pulleys with which it cooperates, provides satisfactory operation after positioning, in all points comparable to that of belts tensioned using known methods by increasing the between axis distance of the pulleys or by means of a tensioning device. Complementarily to this problem arises that of providing such a belt whose good operating characteristics are not affected by temperature variations, on the one hand, and which, on the other hand, are well suited for equipping transmission systems using small diameter pulleys, as are now proposed in the household electric appliance, motor car, and domestic tool fields.

SUMMARY OF THE INVENTION

These problems are solved or ameliorated, in accordance with the invention, by the fact that the material forming the matrix is a rubbery material of the type used for normal belts (for example, with trapezoidal section, with or without teeth), so that satisfactory adhesion is obtained and by the fact that the longitudinal reinforcement of the belt is chosen with respect to its physical tension characteristics, on the one hand, and its positioning in the matrix, on the other, so that the belt has an overall extension modulus sufficiently low so that it makes it possible to fit the belt on the pulleys with which it cooperates and yet keeps a minimum appropriate tension after positioning so as to ensure satisfactory operation of the transmission which it equips.

In a preferred embodiment of the invention, the geometric positioning of the twisted cords forming the longitudinal reinforcement in the rubbery matrix is that of a helical winding whose turns are separated from each other, on the one hand. The twisted cords are on the other hand, stabilized under a very low or substantially zero tension during manufacture of the belt.

The distance between the twisted cords may vary to a large extent. It is advantageously between d and 40d, when d designates the diameter of the twisted cords.

According to another characteristic of the invention, the belt is manufactured to a length less than the nominal length of the transmission which it is designed to equip. Thus, during fitting over the pulleys with which it cooperates and under normal operating conditions, the belt undergoes lengthening between 2 and 20% (advantageously between 2 and 15%) with respect to its length measured on a test-bench of the type defined in the AFNOR No. R15-506 standard or in the DIN 7867 standard and which provide measurement under a tension force.

A belt of the invention whose total extension modulus is of the order of 4 to 80 daN/mm for 1 cm of width, and whose tension during operation is of the order of 2 to 20 daN/cm of width, may be readily positioned over the pulleys with which it cooperates. For this, it is sufficient to bring it to a length slightly greater than the nominal length of the transmission which it equips by applying a tractive force, and tractive forces of the order of 40 to 160 daN/cm of width applied longitudinally of the belt have proved appropriate.

BRIEF DESCRIPTION OF THE DRAWINGS

The invention will be well understood from the following description, given by way of example and with reference to the accompanying drawings in which.

DETAILED DESCRIPTION OF THE INVENTION

Figure 2:
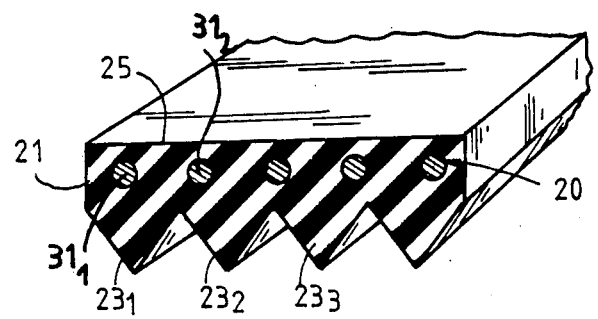
FIG. 2 is a sectional view through line II—II of FIG. 1, but on a larger scale and partially in perspective.
Figure 1:
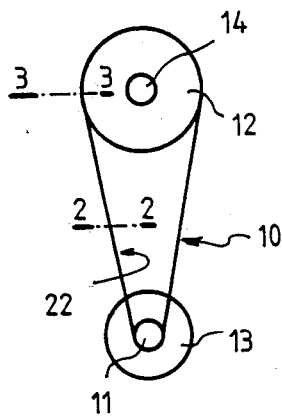
FIG. 1 is a schematic view of an endless power transmission belt in accordance with the invention.
Figure 3:
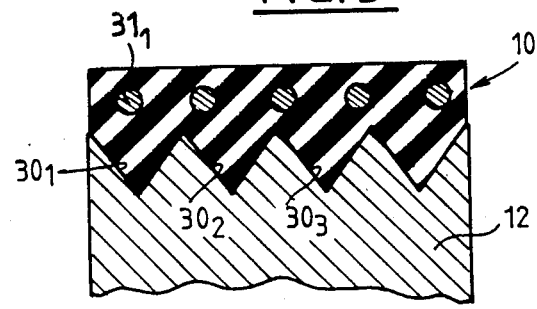
FIG. 3 is a schematic sectional view through line III—III of FIG. 1, also on a larger scale.

Referring to FIGS. 1 to 3, which show a power transmission whose endless belt 10 cooperates with at least two pulleys 11 and 12 fixed respectively to the drive shaft of a motor 13 and to the driven shaft 14, which may be that of the drum of a clothes washing machine or a clothes drying machine, a tool for domestic use, or else a motor vehicle equipment (without these indications, of course, having any limitative character whatsoever).

The endless belt 10 has a longitudinal reinforcement of twisted cords 20 embedded in an elastomer matrix 21 such as a polychloroprene rubber or natural rubber mixture or of any other rubber chosen from the dienic elastomers, such as polybutadiene or SBR (styrene butadiene rubber) and of a usual type known for manufacturing endless power transmission belts, because of its good adhesion properties.

Figure 4:
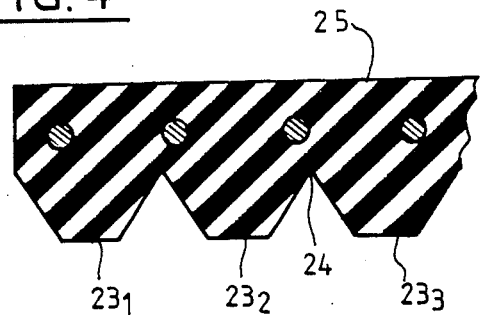
FIG. 4 is a partial schematic view of another embodiment of a belt of the invention.

The endless belt 10 is advantageously of the "ribbed" type—that is to say, formed on its internal face 22 with teeth $23_1$, $23_2$, $23_3$, etc . . . ; whose pitch is standardized, as well as their cross section, triangular as shown in FIG. 2 or trapezoidal as shown in FIG. 4, each reference H, J, K, L, M, of the DIN 7867 standard or of the AFNOR No. R15-506 standard also defining the thickness of the belt measured between the bottom 24 of the teeth and the external face 25 of the belt. As shown in FIG. 3, the endless belt 10 cooperates with pulleys 11 and 12 whose rim has a profile mating with that of the teeth 23—that is to say, has grooves $30_1$, $30_2$, $30_3$ having the same arrangement and of a cross section similar to that of the teeth 23, which are housed in the grooves 30 during operation of the transmission system.

So as to make possible both automatic fitting of the belt 10 on the pulleys 11 and 12 whose between axis distance is fixed or, in a variant, may vary by a small value (0 to 2%) during use as well as satisfactory operation of the transmission after the belt 10 has been fitted, the invention uses a longitudinal reinforcement such as the twisted cord 20 whose constituent material, positioning and stabilization are such that the total extension modules of the belt has a relatively low value (of the order of 4 to 80 daN/mm for 1 cm of width at 20° C.) while having, after automatic fitting, a minimum tension during operation of the order (of 2 to 20 daN/cm of width).

For this, the invention provides for formation of the belt 10 using a process similar to the known process, in which a rough shape is first of all formed on a cylindrical drum by successive positioning of one or more layers of gum, then the reinforcement in the form of twisted cords (for example, made from polyamide or polyester, or acrylic fibers or else aramide fibers, from rayon or cotton) is disposed on the rough shape in a helical winding with non jointing turns, then again one or more layers of gum is disposed on the reinforcement. The assembly is then vulcanized and then subsequently cut to the width corresponding to the desired number of teeth for each belt or else, in some constructions, machined to the desired profile.

In accordance with the invention, besides the fact of disposing the twisted cords 20 in a helical winding with non jointing turns $31_1$, $31_2$, $31_3$, etc . . . , the twisted cords 20 have, on the one hand, a low modulus, and, on the other, are stabilized under a very low or substantially zero tension, by the usual thermo-mechanical stabilization means known for manufacturing belts with a rubber matrix and a textile web.

In preferred embodiments, the spacing between the successive turns of the twisted cords is chosen in correspondance with the diameter thereof, and preferably at a value between d and 40d, d designating the diameter.

Thus, with the invention, belts are obtained whose total extension modulus is of the order of 4 to 80 daN/mm for 1 cm of width at 20° C.—that is to say, having values appreciably less than those of the known ribbed or V belts, in which the total extension modulus is of the order of 80 to 400 daN/mm for 1 cm of width at the same temperature.

This low value of the extension modulus then makes automatic fitting of the belt 10 on pulleys 11 and 12 possible, by exerting on the belt 10 a attractive force which brings it to a length slightly greater than the nominal length of the transmission which it forms with the pulleys.

Good results have been obtained by exerting a tractive force of the order of 40 to 200 daN/cm of width, depending on the length of the belt 10.

Figure 5:
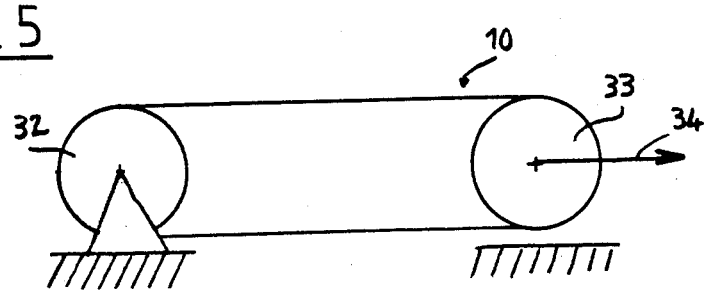
FIG. 5 is a very schematic view of a measuring bench.

To give the belt 10 during operation a minimum tension ensuring satisfactory power transmission under a given extension, advantageously a tension between 2 and 20 daN/cm of width, the invention associates with a transmission of given nominal length a belt which, before fitting, is of a length less then the nominal length. More precisely, the invention contemplates dimensioning the belt so that, during fitting over the pulleys with which it cooperates and under normal operating conditions, it stretches by a value between 2 and 20%, (advantageously, between 7 and 15%) with respect to its length measured on a test-bench of the type defined in the AFNOR No. R15-506 standard or in the DIN 7867 standard. Such a test-bench is shown schematically in FIG. 5, with pulleys 32 and 33 over which the belt 10 is fitted, and the indication of the application of a force, shown schematically at 34, the force being determined for each tooth or rib on the two strands of the belt.

A belt of the invention, having the above defined characteristics, has tension which remains practically unchanged during the usual temperature variations to which it is subjected, which further increases the ease of use thereof.

EXAMPLE

A belt in accordance with the invention was manufactured by embedding in a polychloroprene rubber matrix a longitudinal reinforcement formed by polyamide twisted cords of (940×2) decitex. The twisted cords, having a diameter of 0.7 mm, were positioned so as to form the longitudinal reinforcement of the belt in the form of a helical winding whose turns were separated from each other by 2 mm.

The twisted cords were stabilized, and the belt then had a total extension modulus of the order of 7 daN/mm extension for 1 cm of width at 20° C.

The length of the belt, measured on the test-bench according to the AFNOR No. R15-506 standard or DIN 7867 standard, was 1100 mm.

After fitting on a transmission of a nominal length of 1200 mm, by exerting on the belt a tractive force of 76 daN/cm of width, it was found that the tension during operation was 10 daN/cm of width.

No modification of this tension was measurable for temperature variations between 5 and 35° C.

A belt of the invention is particularly appropriate for equipping apparatus whose between axis distance is likely to vary (from 0 to 2%) during use—whereas, for such apparatus, known belts are totally inappropriate because of their incapacity to provide satisfactory operation.

What is claimed is:

1. An endless power transmission belt comprising:
   (a) a matrix made from an elastomeric material and
   (b) a longitudinal reinforcement embedded in said matrix, said longitudinal reinforcement having an overall extension modulus:
      (i) that is sufficiently low so that, in use, it is possible to fit the endless power transmission belt over fixed pulleys by exerting a tractive force on the endless power transmission belt and
      (ii) that is sufficiently high so that, after the endless power transmission belt has been fitted over the pulleys, the endless power transmission belt maintains a minimum appropriate tension.

2. An endless power transmission belt as recited in claim 1 wherein said matrix is made from rubber.

3. An endless power transmission belt as recited in claim 1 wherein:
   (a) said longitudinal reinforcement comprises twisted cords wound in multiple helical turns in said matrix;
   (b) said multiple helical turns are not in contact with each other; and
   (c) said twisted cords have very low or substantially zero tension when the endless power transmission belt is relaxed.

4. An endless power transmission belt as recited in claim 3 wherein the distance between two consecutive ones of said multiple helical turns is between d and 40d, wherein d designates the diameter of said twisted cords.

5. An endless power transmission belt as recited in claim 3 wherein the material forming said twisted cords is selected from the group consisting of polyamides, polyesters, aramides, rayon, cotton, and acrylic fibers.

6. An endless power transmission belt as recited in claim 1 wherein:
   (a) the total extension modulus of the endless power transmission belt is between 4 and 80 daN/mm for 1 cm of width at 20° C. and
   (b) the tension in the endless power transmission belt after the endless power transmission belt has been fitted over the pulleys and before the endless power transmission belt is used to transmit power is between 2 and 20 daN/cm of width.

7. An endless power transmission belt as recited in claim 1 wherein the endless power transmission belt is ribbed.

8. A power transmission comprising:
   (a) at least two pulleys the spacing between which is at least approximately fixed, said at least two pulleys being sized and shaped so that an endless power transmission belt trained over them has a given nominal length;
   (b) and endless power transmission belt trained over said at least two pulleys, said endless power transmission belt:
      (i) having a length less than said nominal length prior to being trained over said at least two pulleys;
      (ii) having an overall extension modulus such that it can be trained over said at least two pulleys by a tractive force of between 40 and 160 daN/cm of width
      (iii) comprising:
         (A) a matrix made from an elastomeric material and
         (B) a longitudinal reinforcement embedded in said matrix, said longitudinal reinforcement having an overall extension modulus:
            (1) that is sufficiently low so that, in use, it is possible to train said endless power transmission belt over said at least two pulleys by exerting a tractive force on said endless power transmission belt and
            (2) that is sufficiently high so that, after said endless power transmission belt has been trained over said at least two pulleys, said endless power transmission belt maintains a minimum appropriate tension.

9. A power transmission as recited in claim 8 wherein the length of said power transmission belt is between 2% and 20% less than said nominal length.

10. A power transmission as recited in claim 9 wherein the length of said power transmission belt is between 2% and 15% less than said nominal length.

11. A power transmission as recited in claim 8 wherein, after said endless power transmission belt has been trained over said pulleys and before said endless power transmission belt is used to transmit power, the tension in said power transmission belt is between 2 and 20 daN/cm of width.

12. A power transmission as recited in claim 8 wherein said matrix is made from rubber.

13. A power transmission as recited in claim 8 wherein:
   (a) said longitudinal reinforcement comprises twisted cords wound in multiple helical turns in said matrix;
   (b) said multiple helical turns are not in contact with each other; and
   (c) said twisted cords have very low or substantially zero tension when said endless power transmission belt is relaxed.

14. A power transmission as recited in claim 13 wherein the distance between two consecutive ones of said multiple helical turns is between d and 40d, wherein d designates the diameter of said twisted cords.

15. The power transmission as recited in claim 13 wherein the material forming said twisted cords is selected from the group consisting of polyamides, polyesters, aramides, rayon, cotton, and acrylic fibers.

16. A power transmission as recited in claim 8 wherein:
   (a) the total extension modulus of said endless power transmission belt is between 4 and 80 daN/mm for one cm of width at 20° C. and
   (b) the tension in said endless power transmission belt after said endless power transmission belt has been trained over said pulleys and before said endless power transmission belt is used to transmit power is between 2 and 20 daN/cm of width.

17. A power transmission as recited in claim 8 wherein said endless power transmission belt is ribbed.

18. An endless power transmission belt comprising:
(a) a matrix made from an elastomeric material and
(b) a longitudinal reinforcement embedded in said matrix, said longitudinal reinforcement having an overall extension modulus:
  (i) that is sufficiently low so that it is possible to fit the endless power transmission belt over spaced apart pulleys by exerting a tractive force on said belt and
  (ii) that is sufficiently high so that, after the endless power transmission belt has been fitted over the pulleys, said belt maintains a minimum appropriate tension.

* * * * *